United States Patent [19]
Linner

[11] 3,790,800
[45] Feb. 5, 1974

[54] RADIATION DETECTION SYSTEM WITH FAIL SAFE FEATURE

[75] Inventor: Leslie Richard Linner, Chaffee, Colo.

[73] Assignee: Honeywell Inc., Minneapolis, Minn.

[22] Filed: Dec. 27, 1972

[21] Appl. No.: 318,958

[52] U.S. Cl.............................. 250/372, 250/374
[51] Int. Cl............................................. G01j 5/36
[58] Field of Search............................ 250/372, 374

[56] References Cited
UNITED STATES PATENTS
3,342,995   9/1967   Axmark ......................... 250/372
3,428,901   2/1969   Blackett......................... 250/372 X
3,525,907   8/1970   Abromaitis ..................... 250/372 X Primary Examiner—Archie R. Borchelt
Attorney, Agent, or Firm—Lamont B. Koontz & Theodore F. Neils

[57] ABSTRACT

An internal ionization radiation sensor operates to discharge a capacitor in the presence of incident radiation. The recharging current is sensed by a threshold output device. In one embodiment, the threshold output device is prevented from receiving the additional current necessary to be triggered if the radiation sensor fails in the runaway mode. The additional current to trigger the threshold output device is supplied from a second capacitor which is prevented from charging by a runaway radiation sensor.

7 Claims, 2 Drawing Figures

PATENTED FEB 5 1974

3,790,800

RADIATION DETECTION SYSTEM WITH FAIL SAFE FEATURE

BACKGROUND OF THE INVENTION

This invention relates to radiation detection systems wherein an internal gas ionization radiation sensor is used.

Internal gas ionization radiation sensors, for instance of the type disclosed in U.S. Pat. No. 3,344,302 issued to R. O. Engh and R. G. Johnson, have previously been used for radiation detection systems. The configuration of the electrode structure in such a sensor can be altered to provide certain sensing properties such as disclosed in U.S. Pat. No. 3,488,492 issued to R. J. Niksarian. These radiation sensors have a breakdown potential such that when the voltage level of one electrode with respect to the other is above this potential, incident radiation impinging on the radiation sensor will cause an ionization event thereby permitting a current to flow through the radiation sensor. After this inoization event takes place the voltage across the radiation sensor falls to a sustaining potential. This is the voltage that must be maintained across the radiation sensor to continue current flow.

If the intensity of incident radiation impinging on the radiation sensor is quite high, the sensor operates in a saturation mode whereby ionization occurs immediately upon the applied voltage exceeding the breakdown potential of the radiation sensor. At substantially lower intensities of incident radiation, ionization will not occur necessarily at the time the applied voltage exceeds the breakdown potential of the radiation sensor. With relatively few photons reaching the region between the electrodes where photons are effective in causing an ionization event, the time duration to ionization, measured from the time of the applied voltage exceeding the breakdown potential, must be described probabilistically. Once such an ionization event has occurred, the radiation sensor will not provide information upon the subsequent arrival of further photons in the proper region between the sensor electrodes until conduction has been extinguished. This must be accomplished by reducing the applied voltage below the sustaining potential so that, in effect, the radiation sensor is reset for another ionization event.

Such a resetting of the radiation sensor, if done rapidly, allows the radiation sensor to provide an indication of the intensity of the incident radiation impinging upon it. This is because the above probable time duration to ionization decreases with an increasing radiation intensity. At ionization, a sudden current increase occurs which is terminated at the time of resetting. Thus, a current pulse is formed for each ionization event and the frequency of such current pulses is a measure of the intensity of incident radiation. Further, rapid resetting will keep the average current through the radiation sensor itself at a low value and this average current also provides an indication of incident radiation intensity.

Internal gas ionization radiation sensors have a failure mode, termed the runaway mode, whereby the radiation sensor simulates a properly operating radiation sensor sensing incident radiation at a saturation level. In the runaway mode, the radiation sensor will experience an ionization event upon the applied voltage exceeding the breakdown potential despite the absence of incident radiation impinging upon the tube. In many applications it is particularly important that a radiation detection system not provide a false indication of the presence of incident radiation at the beginning of each time duration that the detection system is brought into operation. Thus, provision in the detection system design to prevent a false indication of incident radiation at each time duration that the radiation detection system is brought into operation is required.

SUMMARY OF THE INVENTION

A detection system circuit is provided such that the voltage applied to the radiation sensor is supplied from a capacitor. The current flow through the radiation sensor, upon the occurrence of an ionization event, causes this capacitor to discharge subsequently to a voltage value less than the sustaining potential. A threshold output device senses the current recharging the capacitor as well as some of the current through the radiation sensor to determine the extent of incident radiation and its sufficiency to trigger an output indication.

In an extended version of this circuit, the above current through the threshold device is limited to not exceeding a value beyond what is sufficient to maintain the threshold output device in a triggered state once that device has been triggered. An additional capacitor must have become sufficiently charged to provide, by its subsequent discharge, the additional current necessary to trigger an output from the threshold output device. This second capacitor must be charged to a level in excess of the breakdown potential of the radiation sensor plus a second threshold device. A charging of the second capacitor to this level is prevented if the radiation sensor is subject to being in the runaway mode when brought into operation.

DESCRIPTION OF THE PREFERRED EMBODIMENTS

Figure 1:
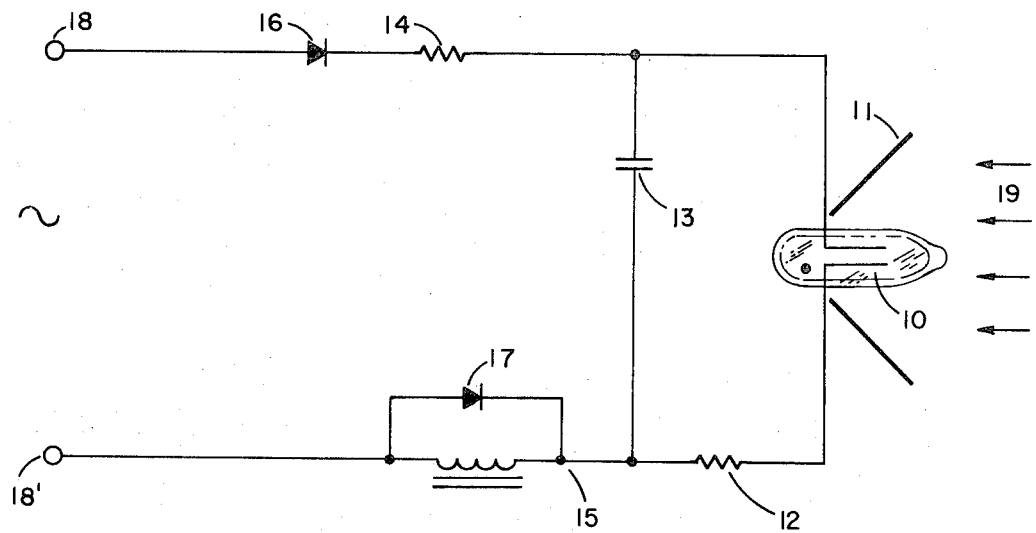
FIG. 1 is a schematic diagram of a first embodiment of the invention.

FIG. 1 is a schematic diagram of the radiation detection system wherein the radiation sensor 10 can be quickly reset from an ionized condition to a non-ionized condition for good sensitivity. The radiation sensor 10 is shown with reflector means 11 to reflect incident radiation, as intercepted over a relatively large area, to impinge on the radiation sensor 10. In series with radiation sensor 10 is resistor 12. Across this series arrangement of radiation sensor 10 and current limiting resistor 12 is supply capacitor 13. This parallel combination is in series with three further components, resistor 14, relay 15 and diode 16. Diode 17 is shown across relay 15 to suppress switching transients.

Terminals 18 and 18' are adapted to be connected to an alternating voltage supply having a peak voltage level in excess of the breakdown potential of the radiation sensor 10. Diode 16 provides half-wave rectification so that a pulsating direct voltage is placed across the remaining components in the circuit. Supply capacitor 13 is thereby charged through resistor 14 to a voltage in excess of the breakdown potential of radiation sensor 10.

In operation, upon incident radiation 19 causing an ionization event in the radiation sensor 10, resulting in the voltage across the sensor falling to the sustaining potential, supply capacitor 13 will discharge through the sensor and resistor 12. If the power supply voltage cycle at this point is such that the instantaneous voltage at terminal 18 exceeds that across capacitor 13, the current level through the radiation sensor 10 and the rate of change of this current level will be affected by the magnitude of both resistors 14 and 12 as well as the magnitude of the capacitor 13. The value of these components will affect the amount of time till the voltage across capacitor 13 falls below the sustaining potential of the radiation sensor 10.

As a second situation, if the instantaneous terminal 18 is not such that, at the time of the ionization occurrence, it exceeds the voltage across capacitor 13 or does not exceed this voltage at some time during the capacitor discharge, diode 16 remains reverse biased. In this case only the magnitude of resistor 12 and capacitor 13 will affect the time till the voltage across capacitor 13 falls below the sustaining potential of the radiation sensor 10.

In the first situation above, when the instantaneous voltage at terminal 18 exceeds the voltage across the capacitor 13 during a discharge through radiation sensor 10, some current will be carried through both the radiation sensor 10 and the relay 15. However, if the diode 16 is reversed biased during the time of the discharge as in the second situation above, no current will be carried through the relay. In either situation, after the voltage across capacitor 13 falls below the sustaining potential of the radiation sensor 10, the sensor is reset and the capacitor discharge terminates. Just after the time of termination of the capacitor discharge, if the instantaneous voltage at terminal 18 exceeds the voltage then on capacitor 13 or at the next time the voltage at terminal 18 so exceeds, a recharging of capacitor 13 occurs and this recharging current also passes through relay 15.

Resistors 14 and 12 are chosen to permit the voltage on capacitor 13 to drop after an ionization event to a level below the sustaining potential of radiation sensor 10 as required. They are also chosen to permit the average current passing through the relay 15, for some level of incident radiation intensity, to exceed the pull-in current of the relay 15 necessary to trigger it into actuation. Further, some additional circuitry, not shown, should be provided to positively prevent the relay from actuating due to the inrush current when power to initiate system operation is first applied at terminals 18 and 18'.

Operation of the radiation sensor 10 as described for the detection system of FIG. 1 makes possible the occurrence of several radiation sensor ionization events and resets during the time when the voltage at terminal 18 exceeds the voltage across capacitor 13. The frequency of ionization events depends on the frequency of arrival of photons; i.e., the level of incident radiation. One discharge and reset can occur during the time the voltage at terminal 18 does not exceed the voltage across capacitor 13.

If the supply voltage were applied directly across the sensor without the use of capacitor 13, as in some conventional systems, only two ionization events could occur per cycle. Current in such a conventional system would continue to flow after each ionization event until the supplied voltage becomes less than the sensor sustaining potential. Thus the average current in the relay of the detection system of FIG. 1, made up of short current pulses associated with each occurring ionization event, provides a substantially better indication of the level of incident radiation for levels less than saturation levels.

Figure 2:
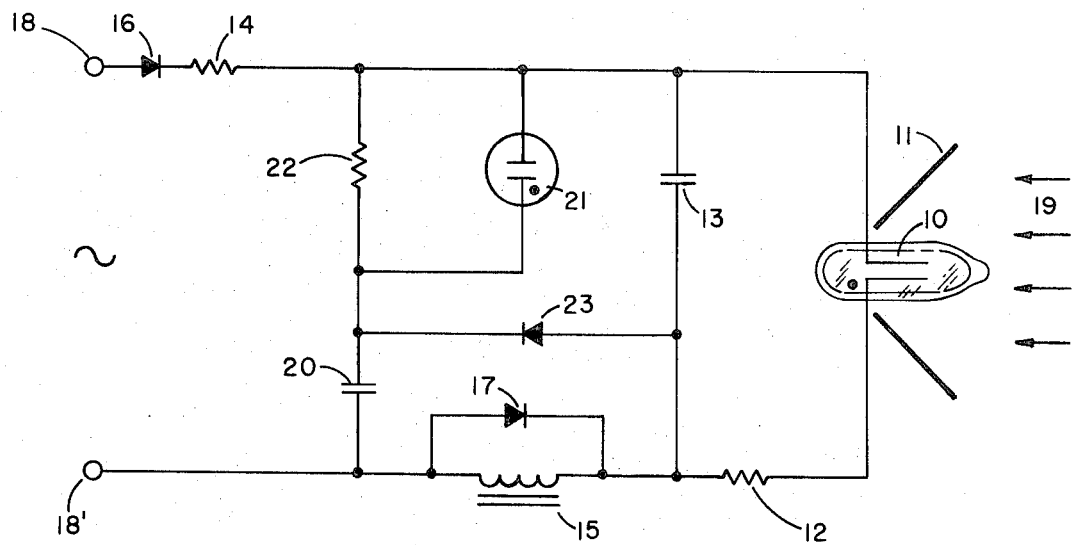
FIG. 2 is a schematic diagram of a second embodiment of the invention.

Referring now to FIG. 2, it will be seen that the basic radiation detection system shown in FIG. 1 is presented again in FIG. 2 with some component additions to provide for protection from a runaway radiation sensor at the initiation of radiation detection system operation. Resistors 14 and 12 are chosen for this system, however, such that the average current through relay 15 cannot exceed the pull-in current required to trigger the relay in the absence of the component additions made to the system in FIG. 2. However, the resistors 12 and 14 are adjusted to provide an average current through relay 15 greater than the holding current of the relay 15 so as to keep it in the actuated condition once it has been triggered into a condition by a current exceeding the relay pull-in current.

The added current necessary to permit the exceeding of the relay pull-in current is supplied from capacitor 20. This added current can be supplied only if the voltage on capacitor 20 is sufficient to exceed both the breakdown potential of the neon tube 21 acting as a voltage threshold device and, in addition, the breakdown potential of the radiation sensor 10.

Capacitor 20 is charged relatively slowly through resistor 22 and, initially, also through neon tube 21. If radiation sensor 10 is a runaway, it will begin to discharge capacitor 13 as soon as the breakdown potential of the sensor is reached. This discharging will prevent capacitor 20 from charging to a value sufficient to break down neon tube 21 with the result that no added current is supplied through radiation sensor 10 upon the occurrence of sensor breakdown and conduction. Relay 15 therefore is not provided with the pull-in current necessary to initiate operation of relay 15. For this system operation limiter to be effective against radiation sensors in the runaway mode, it can be seen that no incident radiation can be allowed to impinge on radiation sensor 10 during initial applications of power to the radiation detection system.

Diode 23, as positioned in the system of FIG. 2, provides a method of preventing the in rush current to capacitor 13 from initiating operation of relay 15 upon the application of power to terminals 18 and 18'. As capacitor 20 charges diode 23 becomes reverse biased thereby having little further effect on the system operation.

The embodiments of the invention in which an exclusive property or right is claimed are defined as follows:

1. An ultraviolet detection system employing a radiation sensor operating through internal gas ionization comprising:

a radiation sensor discharge circuit having a supply capacitor joined in parallel across a series arrangement of said radiation sensor and a first current limiting means, said supply capacitor having first and second terminals at which it is so joined, whereby said radiation sensor, upon breakdown initiated by received radiation, discharges said supply capacitor through said first current limiting means, said radiation sensor discharge circuit to be connected to external components selectively at one of said first and second terminals;

second current limiting means connected in series with said radiation sensor discharge circuit;

current detection means connected in series with said radiation sensor discharge circuit and having a first current threshold value which currents through said current detection means must exceed for an output to be initiated therefrom; and connection means adapted to connect said radiation sensor discharge circuit, said second current limiting means and said current detection means connected as said above to a source of direct current.

2. The system of claim 1 wherein:

said first and second current limiting means limit current passing through said current detection means such that said first current threshold value cannot be reached but that a lesser second current threshold value can be exceeded, said current detection means operating such that said output can be maintained by currents exceeding said second current threshold value;

said current detection means is immediately connected to a selected one of said first and second terminals; and a protective triggering circuit is connected in parallel across said radiation sensor discharge circuit and said current detection means connected as said, said protective triggering circuit having a triggering capacitor joined in series with a parallel arrangement of a third current limiting means and a voltage threshold means, said trigger capacitor so joined at a third terminal thereof and said voltage threshold means having a voltage threshold value which voltages across said voltage threshold means must exceed before appreciable current can be conducted therethrough, whereby sufficient current can be supplied to said current detection means to exceed said first current threshold value when said triggering capacitor becomes sufficiently charged.

3. The system of claim 2 wherein rectifying means is connected between said selected one of said first and second terminals and said third terminal.

4. The system of claim 3 wherein reflector means are employed to increase incident radiation reaching said radiation sensor by reflecting incident radiation intercepted in an area to said radiation sensor.

5. The system of claim 3 wherein said first, second and third current limiting means are resistors.

6. The system of claim 3 wherein said current detection means is a relay.

7. The system of claim 3 wherein said voltage threshold means is a neon tube.

* * * * *